United States Patent
Gan et al.

(10) Patent No.: US 7,200,013 B2
(45) Date of Patent: Apr. 3, 2007

(54) POWER SUPPLY DEVICE AND SINGLE PHOTO-COUPLER CONTROL CIRCUIT THEREOF

(75) Inventors: Hongjian Gan, Taoyuan Hsien (TW); Qinggang Kong, Taoyuan Hsien (TW); Youjun Zhang, Taoyuan Hsien (TW); Jianping Ying, Taoyuan Hsien (TW)

(73) Assignee: DELTA Electronics, Inc., Taoyuan Hsien (TW)

( * ) Notice: Subject to any disclaimer, the term of this patent is extended or adjusted under 35 U.S.C. 154(b) by 36 days.

(21) Appl. No.: 11/158,147

(22) Filed: Jun. 20, 2005

(65) Prior Publication Data

US 2006/0139965 A1    Jun. 29, 2006

(30) Foreign Application Priority Data

Dec. 29, 2004 (TW) ............................. 93141075 A

(51) Int. Cl.
*H02M 3/335* (2006.01)
(52) U.S. Cl. ...................... 363/21.04; 363/97
(58) Field of Classification Search .... 363/21.1–21.12, 363/15–20, 80, 97–98; 323/222, 224, 271, 323/282
See application file for complete search history.

(56) References Cited

U.S. PATENT DOCUMENTS 5,812,383 A * 9/1998 Majid et al. ............. 363/21.05

* cited by examiner

*Primary Examiner*—Rajnikant B. Patel
(74) *Attorney, Agent, or Firm*—J.C. Patents

(57) ABSTRACT

A power supply device and a single photo-coupler control circuit thereof are provided. The power supply device includes a single photo-coupler control circuit, a main converter and an auxiliary converter. The main converter connects to an output load. The auxiliary converter connects in parallel with the main converter. The single photo-coupler control circuit, also connected to the output load, monitors the status of the power supply device and controls the main converter and the auxiliary converter accordingly. The single photo-coupler control circuit only has one photo-coupler. The main converter and the auxiliary converter together provide a first output to the output load when the power supply device works in a normal mode. The main converter is turned off so that only the auxiliary converter provides a second output to the output load when the power supply device works in a standby mode.

12 Claims, 4 Drawing Sheets

POWER SUPPLY DEVICE AND SINGLE PHOTO-COUPLER CONTROL CIRCUIT THEREOF

CROSS-REFERENCE TO RELATED APPLICATION

This application claims the priority benefit of Taiwan application serial no. 93141075, filed on Jan. 29, 2004. All disclosure of the Taiwan application is incorporated herein by reference.

BACKGROUND OF THE INVENTION

1. Field of the Invention

The present invention relates to a power supply device. More particularly, the present invention relates to a power supply device and a single photo-coupler control circuit thereof.

2. Description of the Related Art

With an increasing demand for energy, saving energy has become an unwritten goal for the design of products. In many types of electronic products, power wastage in the standby mode is one big problem that attracts the attention of engineers and designers. At present, various environment protection agencies and governmental organizations would sit together from time to time to lay down some guidelines and rules for reducing energy waste in the standby mode. For example, in a notebook computer, a power source having higher conversion efficiency and lower standby power consumption is always demanded. For a switch mode power source, the switching loss is the principle power loss when operating in the standby mode. The conventional methods of reducing power loss in the power source when operating in the standby mode mainly depend on reducing the loss in switching the main circuit. However, to attain a high power conversion efficiency for a high-power notebook computer, for example, the main circuit must be optimized when fully loaded while the power rating of various main switching elements must be high. Accordingly, power source with a high power rating can hardly be optimized in the standby mode. Furthermore, a power source having a higher power rating will have a larger switching loss under the same switching frequency. Consequently, for a high-power notebook computer, the conventional power source design can hardly reduce power loss in the standby mode.

In recent years, a new method of reducing power source switching loss when operating in the standby mode is provided. In this method, a main converter and an auxiliary converter connected in parallel and operating in the pulse width modulation (PWM) mode are used. FIG. 1 is a block diagram of a conventional power supply device with a main and an auxiliary converter. As shown in FIG. 1, the rectifier 110 rectifies an AC current from an AC power source to output a DC voltage. According to the control signal provided by the controller 122 and the controller 132, the main converter 120 and the auxiliary converter 130 together provide the output power needed by the load LD. The photo-couplers 121 and 131 provide feedback paths for transmitting load signals back to the controllers 122 and 132 respectively while isolating the power source from the load.

In the standby mode, the output power is only provided by the auxiliary converter 130. When operating with a normal load, most power is provided through the main converter 120 while the auxiliary converter 130 operates in a power-limiting mode (that is, the output power is smaller than a definite fixed value). Thus, a high power conversion efficiency and lower standby power loss are simultaneously achieved when this method is applied to the power source of a high-power notebook computer.

However, according to the conventional feedback design, this type of parallel-connected structure requires two feedback circuits with each feedback circuit (mainly a photo-coupler) consuming considerable standby power. Therefore, the significant power loss for this type of design operating in the standby mode can hardly meet the stringent standby power loss standard. In other words, the conventional technique has at least two major problems, namely, the assignment of power between the two converters and the increase in power loss in the standby mode due to the presence of an additional feedback circuit.

SUMMARY OF THE INVENTION

Accordingly, at least one objective of the present invention is to provide a power supply device for managing the provision of power to two parallel-connected converters and reducing standby power loss resulting from the presence of feedback circuits.

At least a second objective of the present invention is to provide a single photo-coupler control circuit such that the output power from a power source supply device can be controlled by a simple and low-cost circuit.

To achieve these and other advantages and in accordance with the purpose of the invention, as embodied and broadly described herein, the invention provides a power supply device. The power supply device mainly comprises a single photo-coupler control circuit, a main converter and an auxiliary converter. The main converter connects to an output load. The auxiliary converter connects in parallel with the main converter. The single photo-coupler control circuit also connects to the output load for monitoring the operating status of the power supply device and controlling the main converter and the auxiliary converter accordingly. The single photo-coupler control circuit only has one photo-coupler. The main converter and the auxiliary converter together provide a first output to the output load when the power supply device works in a normal mode. The main converter is shut down so that only the auxiliary converter provides a second output to the output load when the power supply device works in a standby mode.

According to one preferred embodiment of the present invention, the main converter and the auxiliary converter of the aforementioned power supply device are pulse width modulation (PWM) converters.

According to one preferred embodiment of the present invention, the single photo-coupler control circuit of the aforementioned power supply device comprises a photo-coupler circuit, a regulator, a first controller and a second controller. The photo-coupler circuit connects with the output load for monitoring the working status of the power supply device and outputting a first feedback signal accordingly. The photo-coupler circuit includes the photo-coupler. The regulator connects with the photo-coupler circuit for receiving and adjusting the first feedback signal and then outputting a second feedback signal. The first controller connects with the photo-coupler circuit for receiving the first feedback signal and controlling the main converter accordingly. The second controller connects with the regulator for receiving the second feedback-signal and controlling the auxiliary converter accordingly.

According to one preferred embodiment of the present invention, the main converter of the aforementioned power supply device includes a power factor corrector (PFC) and a DC/DC converter. The PFC corrects the power factor of the main converter. The DC/DC converter connects with the PFC and the single photo-coupler control circuit. In the embodiment, the DC/DC converter is an asymmetrical half bridge converter (AHBC) and the PFC is boost converter, for example. In addition, the auxiliary converter is a flyback converter, for example.

The present invention also provides a single photo-coupler control circuit for monitoring the working state of a power supply device and controlling a main converter and an auxiliary converter of the power supply device accordingly. Hence, the main converter and the auxiliary converter together provide a first output to an output load when the power supply device operates in a normal operating mode and the main converter is shut down so that only the auxiliary converter provides a second output to the output load when the power supply device operates in a standby mode. The single photo-coupler control circuit comprises a photo-coupler circuit, a regulator, a first controller and a second controller. The photo-coupler circuit has one photo-coupler for monitoring the working status of the power supply device and outputting a first feedback signal accordingly. The regulator connects with the photo-coupler circuit for receiving and adjusting the first feedback signal and then outputting a second feedback signal. The first controller connects with the photo-coupler circuit for receiving the first feedback signal and controlling the main converter accordingly. The second controller connects with the regulator for receiving the second feedback signal and controlling the auxiliary converter accordingly.

In the present invention, the two parallel-connected converters utilize just one photo-coupler to feedback an output load signal to primary side of the transformer. In other words, the feedback signal from the photo-coupler is submitted to the controller of the main converter for controlling the output power from the main converter. Furthermore, through the regulator, the feedback signal from the photo-coupler is adjusted to control the output power of the auxiliary converter. Hence, power assignment between the main converter and the auxiliary converter is managed through the regulator. In addition, since only a single photo-coupler is used, power loss in the standby mode is significantly reduced.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE PREFERRED EMBODIMENTS

Figure 1:
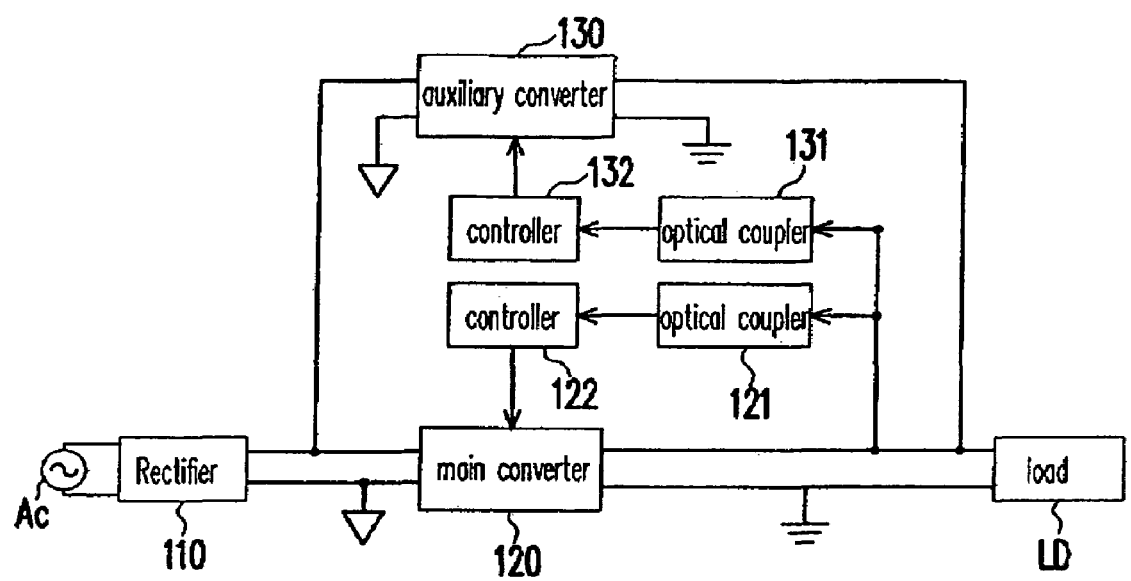
FIG. 1 is a block diagram of a conventional power supply device with two converters.

Reference will now be made in detail to the present preferred embodiments of the invention, examples of which are illustrated in the accompanying drawings. Wherever possible, the same reference numbers are used in the drawings and the description to refer to the same or like parts.

Figure 2:
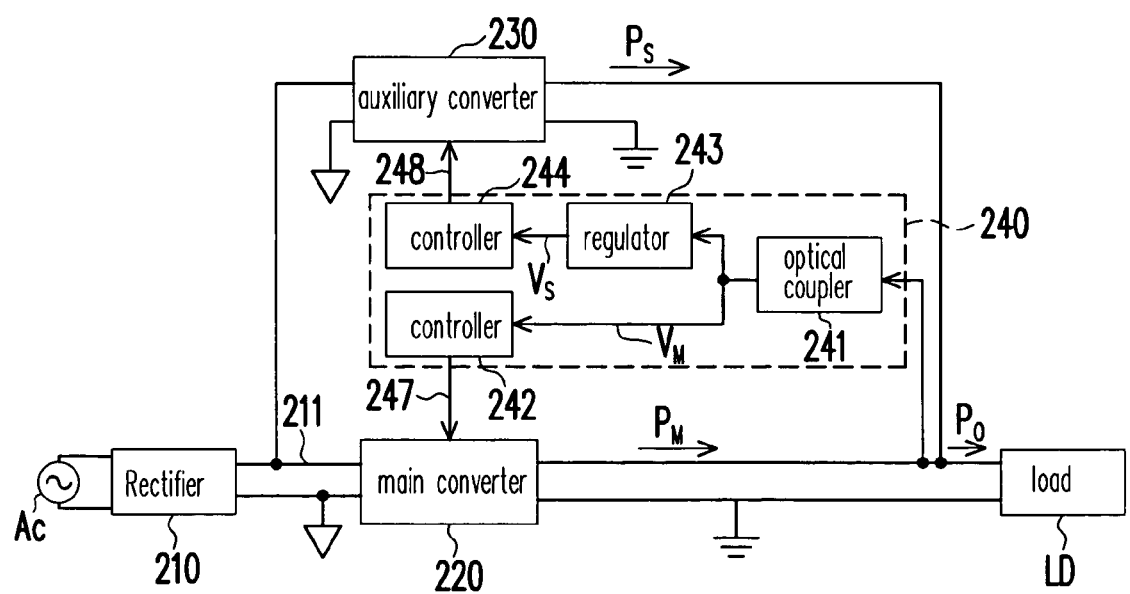
FIG. 2 is a block diagram of a power supply device with two converters according to one preferred embodiment of the present invention.

In general, different types of pulse width modulation (PWM) converters frequently have the same loading characteristics in actual applications, that is, the duty ratio of the converter varies in the same way with the loading. Hence, the signal representing the output load must be fed back to a controller for adjusting the duty ratio (the output power) of the PWM converter. FIG. 2 is a block diagram of a power supply device with two converters according to one preferred embodiment of the present invention. As shown in FIG. 2, the main converter 220 and the auxiliary converter 230 are pulse width modulation (PWM) converters, for example.

In FIG. 2, a rectifier 210 rectifies an AC current from an AC power source and then outputs DC input power 211. The main converter 220 and the auxiliary converter 230 each receives and converts the input power 211 to output a first power $P_M$ and a second power $P_S$ respectively. The power provided by the first power $P_M$ and the second power $P_S$ together is the total output power $P_O$ needed by the load LD. According to the loading status of the output power $P_O$, the single photo-coupler control circuit 240 determines the duty ratio of the first control signal 247 and the second control signal 248. Thereafter, according to the first control signal 247 and the second control signal 248, the magnitude of the first power $P_M$ and the second power $P_S$ output from the main converter 220 and the auxiliary converter 230 are determined.

The aforementioned photo-coupler control circuit 240 further comprises a photo-coupler circuit 241, a regulator 243, a first controller 242 and a second controller 244. The photo-coupler circuit 241 has one photo-coupler for outputting a feedback signal $V_M$. The feedback signal $V_M$ is directly transmitted to the controller 242 for controlling the output power from the main converter 220. Furthermore, through the adjustment of the feedback signal $V_M$ from the photo-coupler circuit 241 by the regulator 243 to produce another feedback control signal $V_S$, the output power from the auxiliary converter 230 is determined. Hence, the regulator 243 can actualize the distribution of power between the main converter 220 and the auxiliary converter 230. In addition, power loss in the standby mode is significantly reduced because only one photo-coupler is used in the photo-coupler circuit 241.

In the normal loading condition, the main converter 220 provides most of the output power so that the auxiliary converter 230 actually operates in a power-limiting mode (that is, the output power is always smaller than a definite fixed value). In the standby mode, the auxiliary converter 230 provides all the output power. Hence the present embodiment can have higher conversion efficiency and lower power loss in the standby mode.

Figure 3:
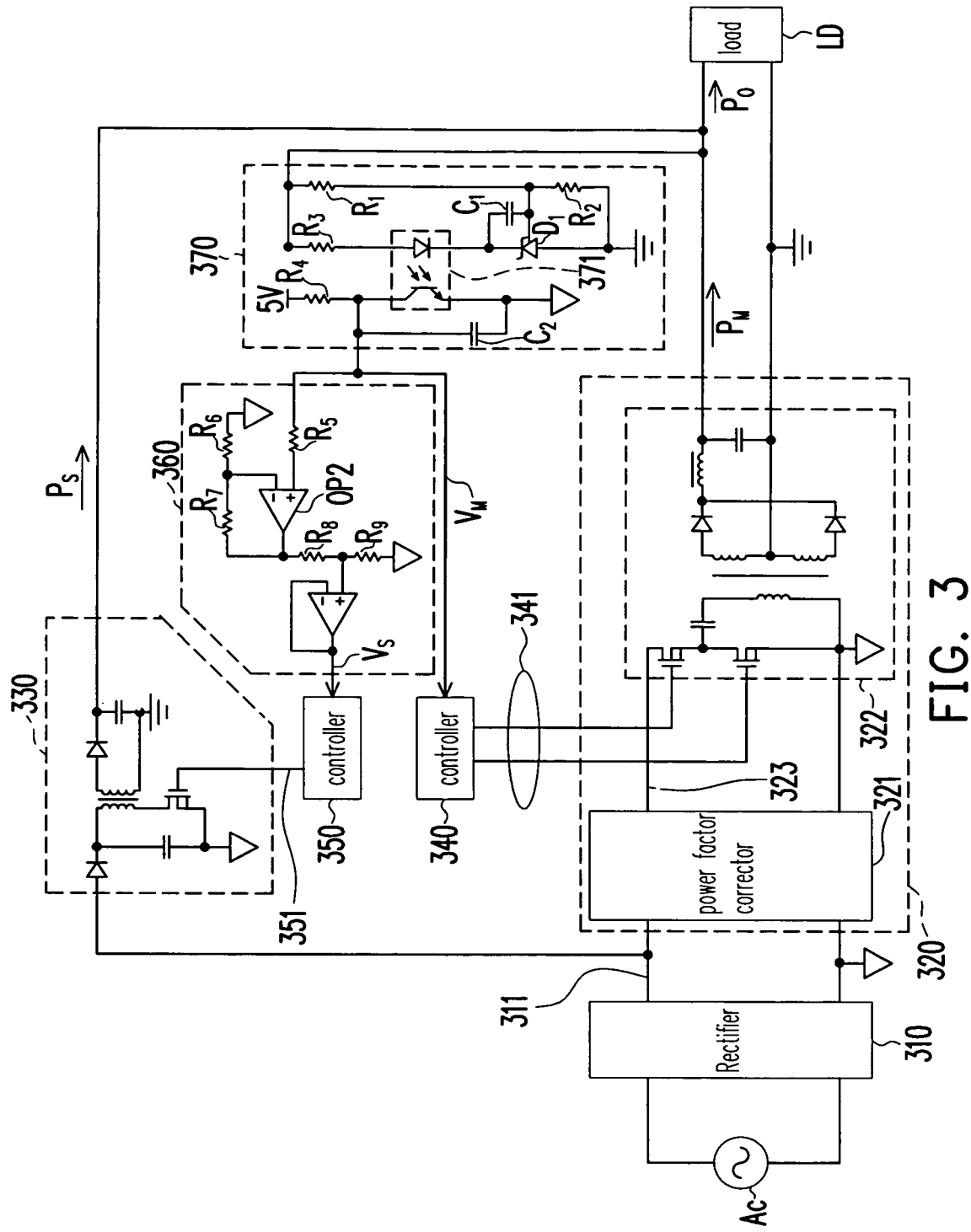
FIG. 3 is a block diagram of a power supply device with two converters according to another preferred embodiment of the present invention.

To explain the present invention better, an alternative embodiment is also described. FIG. 3 is a block diagram of a power supply device with two converters according to another preferred embodiment of the present invention. As shown in FIG. 3, the rectifier 310 rectifies an AC current from a power source to produce DC input power 311. According to the different duty ratio of the first control signal 341 and the second control signal 351 provided by the single photo-coupler control circuit, the first power $P_M$ from the main converter 320 and the second power $P_S$ from the auxiliary converter 330 are determined. Ultimately, the output power $P_O$ required by the load LD is provided.

The aforementioned single photo-coupler control circuit further comprises a photo-coupler circuit 370, a regulator 360, a first controller 340 and a second controller 350. The photo-coupler circuit 370 has one photo-coupler 371 for providing the controller 340 and the controller 350 with a feedback signal (the feedback signals reflect the existing loading status) The amplitude of feedback signal $V_M$ from the photo-coupler circuit 370 is determined according to the output power $P_O$. The primary side of the transformer is isolated from secondary side thereof on the feedback path by the photo-coupler circuit 370.

The feedback signal $V_M$ is directly transmitted to the controller 340 for controlling the firs power $P_M$ output from the main converter 320. Furthermore, the regulator 360 regulates the feedback signal $V_M$ from the photo-coupler circuit 370 to output another feedback signal $V_S$. According to the feedback signal $V_S$, the controller 350 controls the second power $P_S$ output from the auxiliary converter 330.

The aforementioned regulator 360 can be implemented according to the embodiment described below. One terminal of a resistor R5 receives the feedback signal $V_M$ while the other terminal of the resistor R5 is coupled to a non-inverting input terminal of an operational amplifier OP1. One terminal of a resistor R6 is coupled to the first ground wire while the other terminal of the resistor R6 is coupled to the inverting input terminal of the operational amplifier OP1 and a first terminal of a resistor R7. A second terminal of the resistor R7 is coupled to an output terminal of the operational amplifier OP1 and a first terminal of a resistor R8. A second terminal of the resistor R8 is coupled to a first terminal of a resistor R9 and a non-inverting input terminal of an operational amplifier OP2. A second terminal of the resistor R9 is coupled to the first ground wire. An output terminal of the operational amplifier OP2 is coupled to an input terminal of the operational amplifier OP2 for returning the feedback signal $V_S$. The feedback signal $V_S$ is also transmitted to the controller 350.

The aforementioned feedback signal $V_S$ is obtained according to the following formula:

$$V_S = \frac{R9}{R8+R9}\left(1 + \frac{R7}{R6}\right)V_M$$

Hence, power distribution between the main converter 320 and the auxiliary converter 330 can be implemented through the regulator 360.

The aforementioned converter 320 includes a power factor corrector (PFC) 321 and a DC/DC converter 322, for example. The PFC 321 receives power 311 and corrects is power factor to produce output power 323. The DC/DC converter 322 is coupled to the PFC 321 for receiving the power 323 and outputting a first power $P_M$ (a portion of the power $P_O$) according to the duty ratio of the control signal 341. In the present embodiment, the DC/DC converter 322 is an asymmetrical half bridge converter (AHBC) and the PFC is a boost converter, for example. In addition, the auxiliary converter 330 is a flyback converter, for example. Since the boost converter, the AHBC and the flyback converter are unrelated to the present invention, a detailed description of these devices is omitted.

Figure 4:
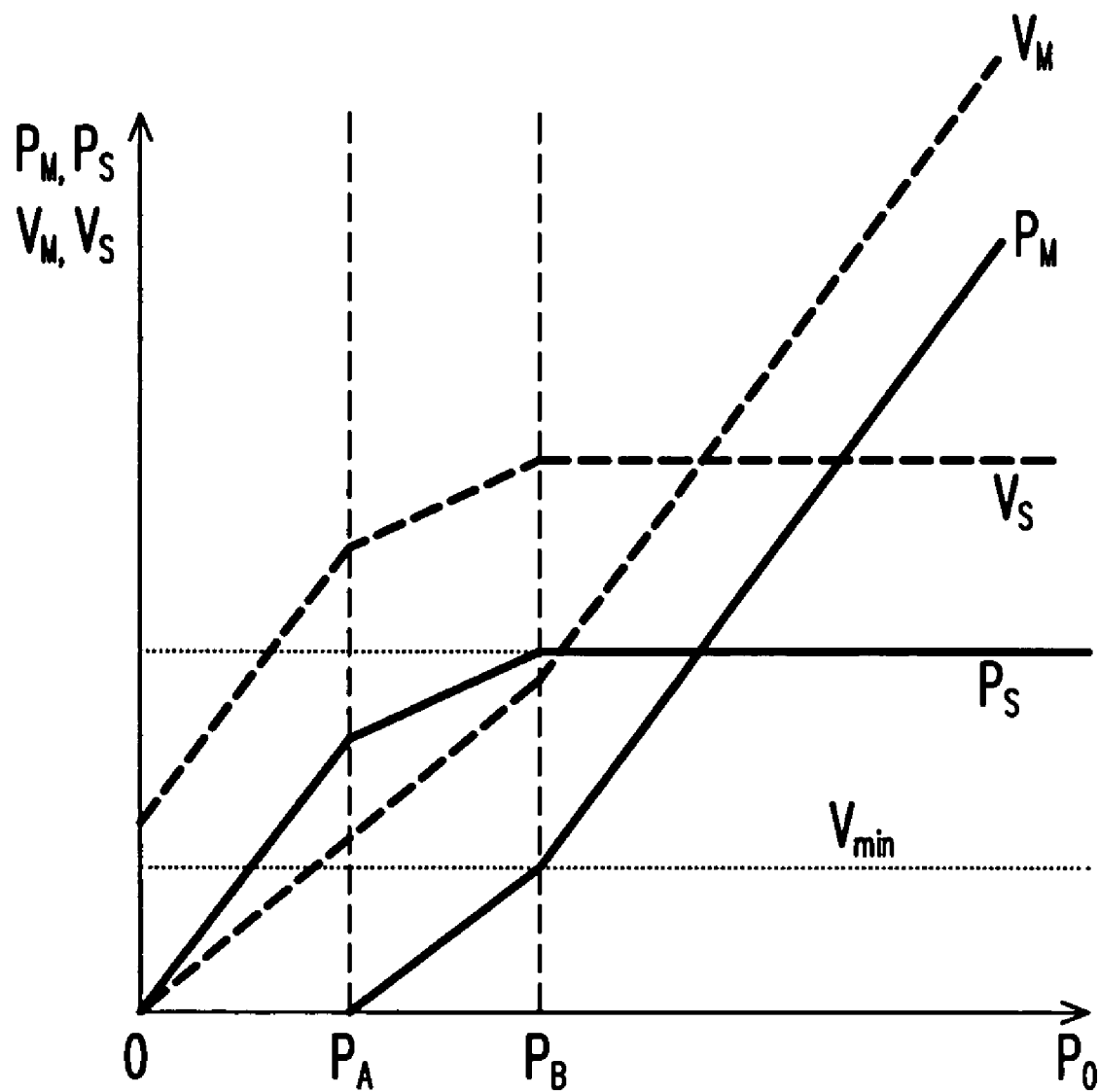
FIG. 4 is a graph showing the relation between the power distribution of the two converters and the variation of feedback signals at different output power according to one preferred embodiment of the present invention.

FIG. 4 is a graph showing the relation between the power distribution of the two converters and the variation of feedback signals at different output power according to one preferred embodiment of the present invention. As shown in FIG. 4, the vertical axis represents the output power $P_M$ and $P_S$ or feedback signal voltage $V_M$ and $V_S$ of the two converters. The horizontal axis represents the total power $P_O$ output from the power supply device and Vmin represents the smallest voltage of the feedback signal from the controller.

When the output power $P_O$ is between $0 \sim P_A$, because the feedback signal $V_M$ from the photo-coupler is smaller than Vmin (leading to no output from the controller) there is no output from the main converter. After the feedback signal $V_M$ has undergone an adjustment through the regulator; the feedback signal $V_S$ will be greater than Vmin. Hence, the auxiliary converter will output a corresponding power $P_S$ according to the feedback signal $V_S$. At this moment, the main converter will not provide power so that the auxiliary converter is the sole provider of power and thus $P_O=P_S$. Here, $P_A$ will be greater than the greatest output power in the standby mode and, at the same time, the feedback signal $V_M$ and the feedback signal $V_S$ will increase to correspond with any increase in the power $P_O$.

When the output power $P_O$ is between $P_A \sim P_B$, because the feedback signal $V_M$ from the photo-coupler is greater than Vmin, the main converter and the auxiliary converter operates together to provide output power and thus $P_O=P_M+P_S$. Here, $P_M$ is the power output of the main converter. Furthermore, $P_B$ will be considerably smaller than the output power under a fully loaded condition. Similarly, the feedback signal $V_M$ and the feedback signal $V_S$ will increase to correspond with any increase in the power $P_O$.

When the output power $P_O$ is greater than $P_B$, the feedback signal $V_M$ will increase with any increase in the power $P_O$. Due to the adjustment of the regulator, the feedback signal $V_S$ will not change with any increase in the power $P_O$. Therefore, the output power of the auxiliary converter will remain unchanged. That is, the auxiliary converter will operate in a power-limiting mode. Since $P_B$ is considerably smaller than the output power at the fully loaded condition, the approaching of the output power to the fully loaded condition can be regarded as equivalent to $P_O=P_M$.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A power supply device, comprising:
   a main converter connected to an output load;
   an auxiliary converter connected in parallel with the main converter;
   a single photo-coupler control circuit connected to the output load for monitoring the working status of the power supply device and feedback a first control signal, wherein the single photo-coupler control circuit has one photo-coupler; and
   a signal process module processing said first control signal and outputting a second control signal to the control circuit of the auxiliary converter and a third control signal to the control circuit of the main converter.

2. The power supply device of claim 1, wherein the device further comprises a rectifier coupled to the input terminal of the main converter and the auxiliary converter.

3. The power supply device of claim 1, wherein the signal process module comprises:
   a regulator connected to the single photo-coupler control circuit for adjusting the first control signal to output the second control signal;
   a first controller connected to the single photo-coupler control circuit for receiving the first control signal as the third control signal and controlling the main converter accordingly; and
   a second controller connected to the regulator for receiving the second control signal and controlling the auxiliary converter accordingly.

4. The power supply device of claim 1, wherein the main converter further comprises:
   a power factor corrector for correcting the power factor of the main converter; and
   a DC/DC converter connected to the power factor corrector and the single photo-coupler control circuit.

5. The power supply device of claim 4, wherein the DC/DC converter includes an asymmetrical half bridge converter.

6. The power supply device of claim 4, wherein the power factor corrector includes a booster converter.

7. The power supply device of claim 1, wherein the auxiliary converter includes a flyback converter.

8. The power supply device of claim 1, wherein the main converter and the auxiliary converter are pulse width modulation (PWM) converters.

9. The power supply device of claim 1, wherein
   the main converter and the auxiliary converter together provide a first output to the output load when the power supply device operates in a normal operating mode; and
   only the auxiliary converter provides a second output to the output load while the main converter is shut down when the power supply device operates in a standby mode.

10. A single photo-coupler control circuit for monitoring the working status of a power supply device and controlling a main converter and an auxiliary converter of the power supply device accordingly so that the main converter and the auxiliary converter together provide a first output to an output load, the photo-coupler control circuit comprising:
    a photo-coupler circuit having a single photo-coupler for monitoring the working status of the power supply device and outputting a first feedback signal accordingly;
    a regulator connected to the photo-coupler circuit for receiving and adjusting the first feedback signal to output a second feedback signal;
    a first controller connected to the photo-coupler circuit for receiving the first feedback signal and controlling the main converter accordingly; and
    a second controller connected to the regulator for receiving the second feedback signal and controlling the auxiliary converter accordingly.

11. The single photo-coupler control circuit of claim 10, wherein the regulator comprises:
    a fifth resistor with a first terminal for receiving the first feedback signal;
    a sixth resistor with a first terminal connected to the first ground wire;
    a seventh resistor with a first terminal connected to a second terminal of the sixth resistor;
    an eighth resistor with a first terminal connected to a second terminal of the seventh resistor;
    a ninth resistor with a first terminal connected to a second terminal of the eighth resistor and a second terminal connected to the first ground wire;
    a first operational amplifier with a positive input terminal coupled to a second terminal of the fifth resistor, a negative input terminal connected to the first terminal of the seventh resistor and an output terminal connected to the second terminal of the seventh resistor; and
    a second operational amplifier with a positive input terminal connected to the second terminal of the eighth resistor and an output terminal connected to a negative input terminal of the second operational amplifier for outputting the second feedback signal.

12. The single photo-coupler control circuit of claim 10, wherein
    the main converter and the auxiliary converter together provide a first output to an output load when the power supply device operates in a normal operating mode; and
    only the auxiliary converter provides a second output to the output load while the main converter is shut down when the power supply device operates in a standby mode.

* * * * *